US012620524B2

(12) United States Patent
Fujimura

(10) Patent No.: US 12,620,524 B2
(45) Date of Patent: May 5, 2026

(54) TRANSFORMER DEVICE

(71) Applicant: DMG MORI CO., LTD., Nara (JP)

(72) Inventor: Shingo Fujimura, Nara (JP)

(73) Assignee: DMG MORI CO., LTD., Nara (JP)

( * ) Notice: Subject to any disclaimer, the term of this patent is extended or adjusted under 35 U.S.C. 154(b) by 639 days.

(21) Appl. No.: 18/012,141

(22) PCT Filed: Apr. 8, 2021

(86) PCT No.: PCT/JP2021/014871
§ 371 (c)(1),
(2) Date: Dec. 21, 2022

(87) PCT Pub. No.: WO2022/004093
PCT Pub. Date: Jan. 6, 2022

(65) Prior Publication Data

US 2023/0268117 A1 Aug. 24, 2023

(30) Foreign Application Priority Data

Jul. 3, 2020 (JP) ................................ 2020-115656

(51) Int. Cl.
*H01F 27/28* (2006.01)
*H01F 27/02* (2006.01)
(Continued)

(52) U.S. Cl.
CPC ............. *H01F 30/12* (2013.01); *H01F 27/02* (2013.01); *H01F 27/06* (2013.01); *H01F 27/08* (2013.01)

(58) Field of Classification Search
CPC .......... H01F 30/12; H01F 27/02; H01F 27/06; H01F 27/08; H01F 27/002; H01F 27/085; H01F 27/025
(Continued)

(56) References Cited

U.S. PATENT DOCUMENTS 3,792,395 A * 2/1974 Michel .................. H01F 29/025
336/5
5,202,664 A * 4/1993 Poulsen ................ H01F 41/022
336/60

(Continued)

FOREIGN PATENT DOCUMENTS

CN 1206207 A 1/1999
JP 2016081965 A 5/2016
KR 10-1999311 B 7/2019

*Primary Examiner* — Shawki S Ismail
*Assistant Examiner* — Kazi S Hossain
(74) *Attorney, Agent, or Firm* — IP Business Solutions, LLC.

(57) ABSTRACT

A transformer device includes: a transformer including a core and a coil; a suspension tool attachment unit disposed above the coil and connected to the core; and a cover body having an internal space and connected to the suspension tool attachment unit. A suspension tool for suspending the transformer device including the transformer and the cover is attachable to the suspension tool attachment unit. The cover body is provided with: a first opening located below a first phase transformer and allowing communication between the internal space and a space outside the internal space; and a second opening located above a third phase transformer and allowing communication between the internal space and the space outside the internal space. An air flow is formed such that air flows into the internal space through the first opening and is discharged to the space outside the internal space through the second opening.

3 Claims, 10 Drawing Sheets

(51) Int. Cl.
*H01F 27/06* (2006.01)
*H01F 27/08* (2006.01)
*H01F 30/12* (2006.01)

(58) Field of Classification Search
USPC .................................................. 336/5, 55–65
See application file for complete search history.

(56) References Cited

U.S. PATENT DOCUMENTS

| | | | | |
|---|---|---|---|---|
| 8,284,006 | B2 * | 10/2012 | Bacarisse | H01F 27/085 336/90 |
| 2011/0115598 | A1 * | 5/2011 | Wu | H01F 27/325 336/212 |
| 2014/0354386 | A1 * | 12/2014 | Adar | H01F 1/15333 29/605 |
| 2018/0138801 | A1 * | 5/2018 | Chen | H01F 27/2804 |
| 2022/0093325 | A1 * | 3/2022 | Shi | H02M 3/33592 |

* cited by examiner

TRANSFORMER DEVICE

TECHNICAL FIELD

The present invention relates to a transformer device.

BACKGROUND ART

For example, Japanese Patent Laying-Open No. 2016-81965 (PTL 1) discloses a transformer device including: a stack formed by stacking a W-phase, a V-phase, and a U-phase in the up-down direction; and a highly rigid inner frame. The inner frame includes: a base box on which the stack is placed; and a frame body disposed on the base box to surround the stack. A pair of suspension bolts for lifting up and transporting the transformer device are connected to an upper end of the frame body.

CITATION LIST

Patent Literature

PTL 1: Japanese Patent Laying-Open No. 2016-81965

SUMMARY OF INVENTION

Technical Problem

In the transformer device disclosed in the above-mentioned PTL 1, the pair of suspension bolts used for lifting up the transformer device are connected to the frame body surrounding a core of a transformer. In such a configuration, however, a heavy weight of the transformer acts on the frame body, and thus, the frame body surrounding the stack needs to be entirely firmly formed. This may increase the manufacturing cost of the transformer device.

Thus, an object of the present invention is to solve the above-described problem and to provide a transformer device that can be reduced in manufacturing cost in a configuration with consideration given to an operation of lifting up the transformer device.

Solution to Problem

A transformer device according to one aspect of the present invention includes: a transformer including a core and a coil wound around the core; a suspension tool attachment unit disposed above the coil and connected to the core; and a cover body having an internal space that accommodates the transformer and connected to the suspension tool attachment unit. A suspension tool for suspending the transformer device including the transformer and the cover body is attachable to the suspension tool attachment unit. The transformer includes a first phase transformer, a second phase transformer stacked above the first phase transformer, and a third phase transformer stacked above the second phase transformer. The suspension tool attachment unit is connected to the core of the third phase transformer. The transformer device further includes: a first connection member that connects the core of the first phase transformer and the core of the second phase transformer; a second connection member that connects the core of the second phase transformer and the core of the third phase transformer; and a lower frame disposed below the first phase transformer and connected to the first phase transformer. The cover body is supported by the suspension tool attachment unit and the lower frame. The cover body is provided with: a first opening located below the first phase transformer and allowing communication between the internal space and a space outside the internal space; and a second opening located above the third phase transformer and allowing communication between the internal space and the space outside the internal space. An air flow is formed such that air flows into the internal space through the first opening and is discharged to the space outside the internal space through the second opening.

A transformer device according to another aspect of the present invention includes: a transformer including a core and a coil wound around the core; and a suspension tool attachment unit disposed above the coil and connected to the core. A suspension tool for suspending the transformer device is attachable to the suspension tool attachment unit.

According to the transformer device configured as described above, the suspension tool attachment unit to which the suspension tool is attachable is connected to the core of the transformer, and thereby, a heavy weight of the transformer can be exerted on the suspension tool attachment unit disposed above the coil when the transformer device is lifted up. This makes it possible to reduce the manufacturing cost of the transformer device in the configuration with consideration given to the operation of lifting up the transformer device.

Preferably, the transformer includes a first phase transformer, a second phase transformer stacked above the first phase transformer, and a third phase transformer stacked above the second phase transformer. The suspension tool attachment unit is connected to the core of the third phase transformer. The transformer device further includes: a first connection member that connects the core of the first phase transformer and the core of the second phase transformer; and a second connection member that connects the core of the second phase transformer and the core of the third phase transformer.

According to the transformer device configured as described above, when the transformer device is lifted up, a heavy weight of the transformer including the first phase transformer, the second phase transformer, and the third phase transformer stacked in the up-down directions can be exerted on the suspension tool attachment unit.

Further preferably, the transformer device further includes: a lower frame disposed below the first phase transformer and connected to the first phase transformer; and a cover body having an internal space that accommodates the first phase transformer, the second phase transformer, and the third phase transformer and supported by the suspension tool attachment unit and the lower frame.

According to the transformer device configured as described above, the cover body is supported by the suspension tool attachment unit and the lower frame, which makes it possible to provide a frameless structure around the first phase transformer, the second phase transformer, and the third phase transformer. Thereby, the configuration of the transformer device can be simplified.

Further preferably, the cover body is provided with: a first opening located below the first phase transformer and allowing communication between the internal space and the space outside the internal space; and a second opening located above the third phase transformer and allowing communication between the internal space and the space outside the internal space. An air flow is formed such that air flows into the internal space through the first opening and is discharged to the space outside the internal space through the second opening.

According to the transformer device configured as described above, the circumference of each of the first phase transformer, the second phase transformer, and the third phase transformer is frameless, so that air as cooling air can flow more smoothly in the internal space. Thereby, the cooling efficiency for the transformer can be improved.

Further preferably, the transformer device further includes an electric device disposed below the first phase transformer and supported by the lower frame.

According to the transformer device configured as described above, the electric device can be disposed by making use of the space below the first phase transformer.

Further preferably, the transformer device further includes a third connection member that connects the cover body and one of the suspension tool attachment unit and the lower frame, and that is adjustable in position in accordance with a mutual positional relation between the cover body and the connected one.

According to the transformer device configured as described above, the mutual positional deviation between the cover body and the above-mentioned connected one can be absorbed by adjusting the position of the third connection member. This makes it possible to facilitate the operation of attaching the cover body.

Further preferably, the transformer includes a first phase transformer, a second phase transformer, and a third phase transformer that are arranged in the horizontal direction. The suspension tool attachment unit is connected to the core of the first phase transformer, the core of the second phase transformer, and the core of the third phase transformer.

According to the transformer device configured as described above, when the transformer device is lifted up, a heavy weight of the transformer including the first phase transformer, the second phase transformer, and the third phase transformer arranged in the horizontal direction can be exerted on the suspension tool attachment unit.

Advantageous Effects of Invention

As described above, the present invention can provide a transformer device that can be reduced in manufacturing cost in a configuration with consideration given to the operation of lifting up the transformer device.

DESCRIPTION OF EMBODIMENTS

Figure 1:
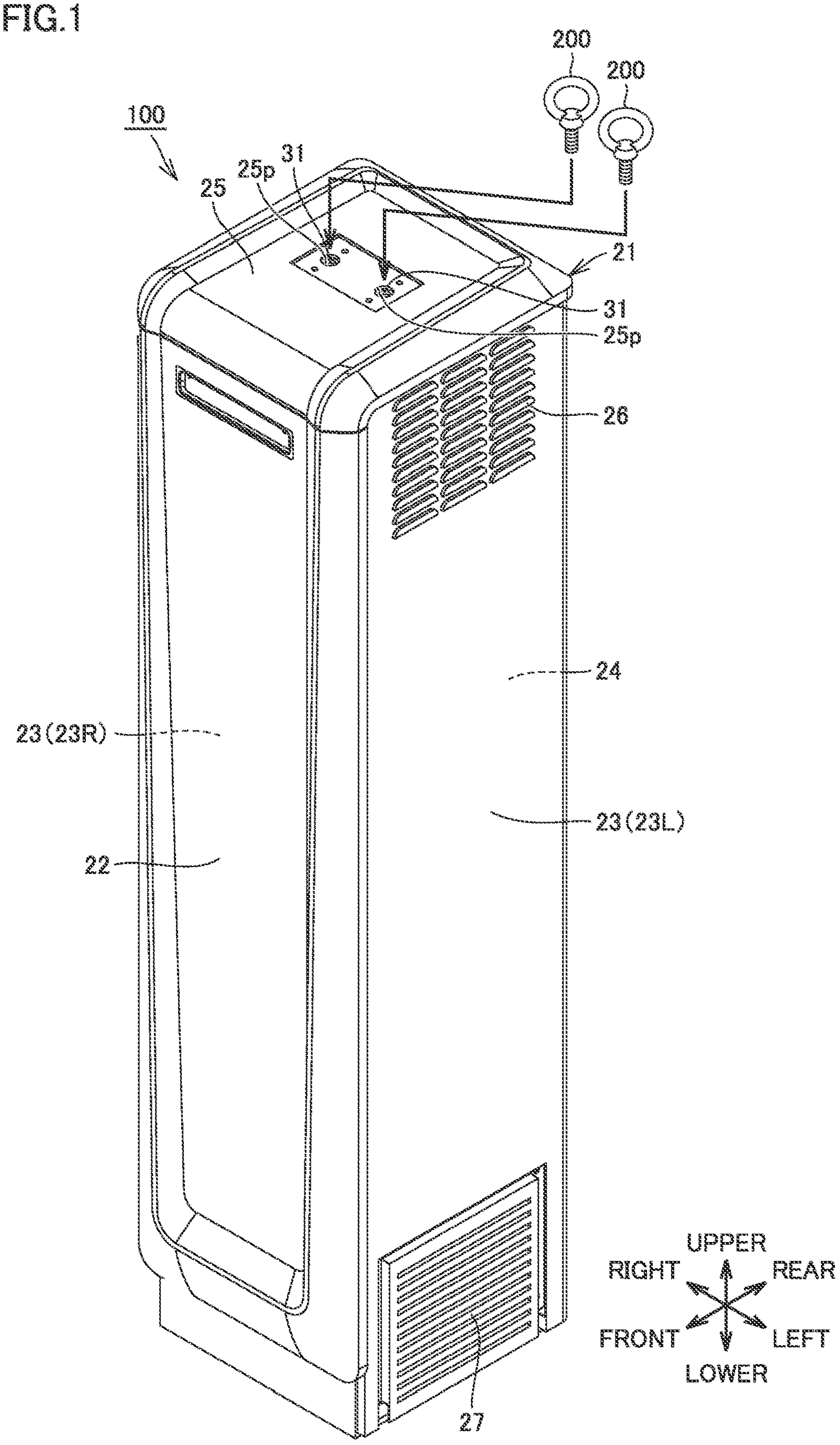
FIG. 1 is a perspective view showing a transformer device according to a first embodiment of the present invention.

Embodiments of the present invention will be hereinafter described with reference to the accompanying drawings. In the drawings referred to below, the same or corresponding members are denoted by the same reference characters.

First Embodiment

Figure 2:
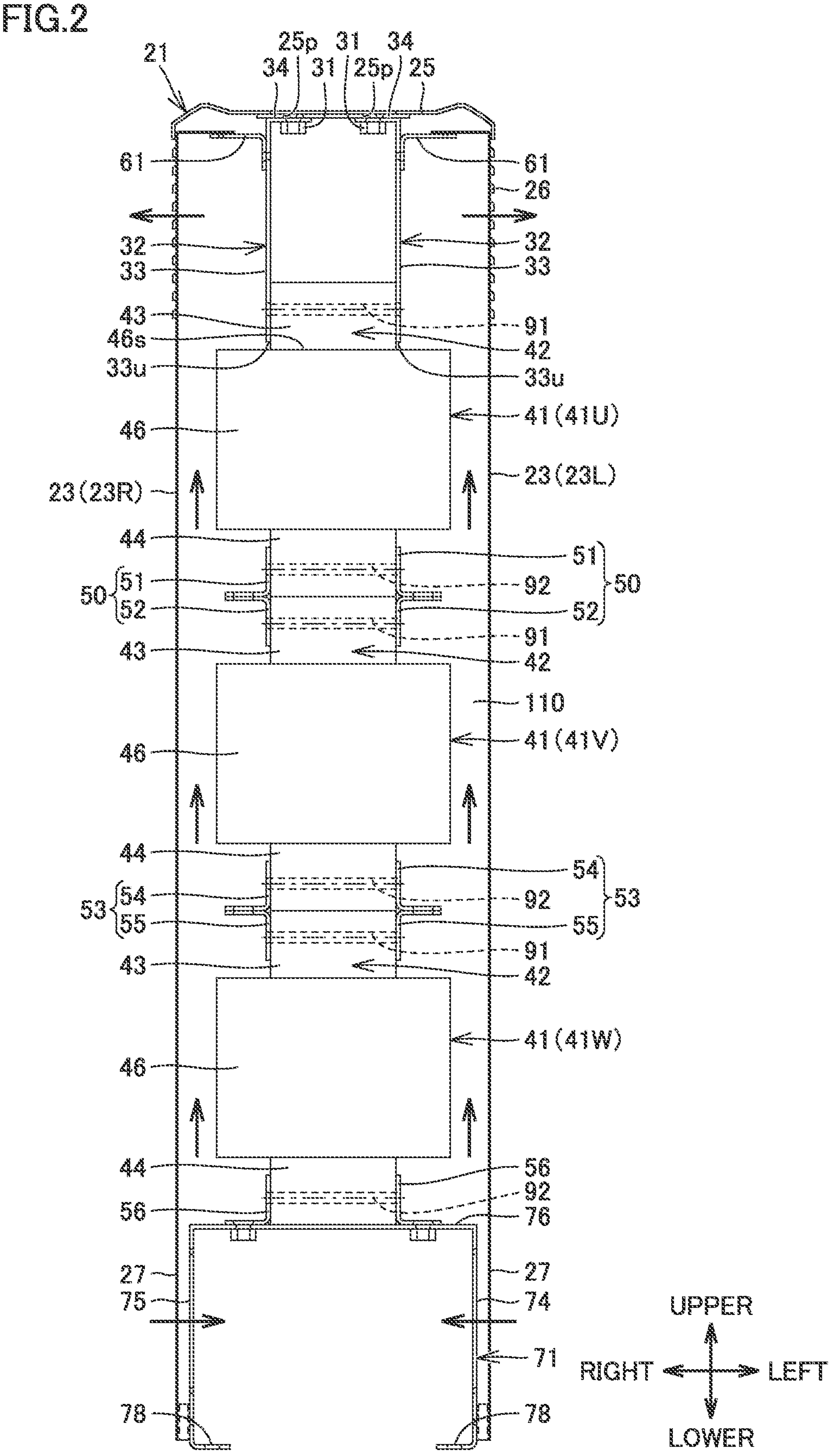
FIG. 2 is a cross-sectional view showing an internal structure of the transformer device shown in FIG. 1.

FIG. 1 is a perspective view showing a transformer device according to the first embodiment of the present invention. FIG. 2 is a cross-sectional view showing the internal structure of the transformer device shown in FIG. 1.

Figure 3:
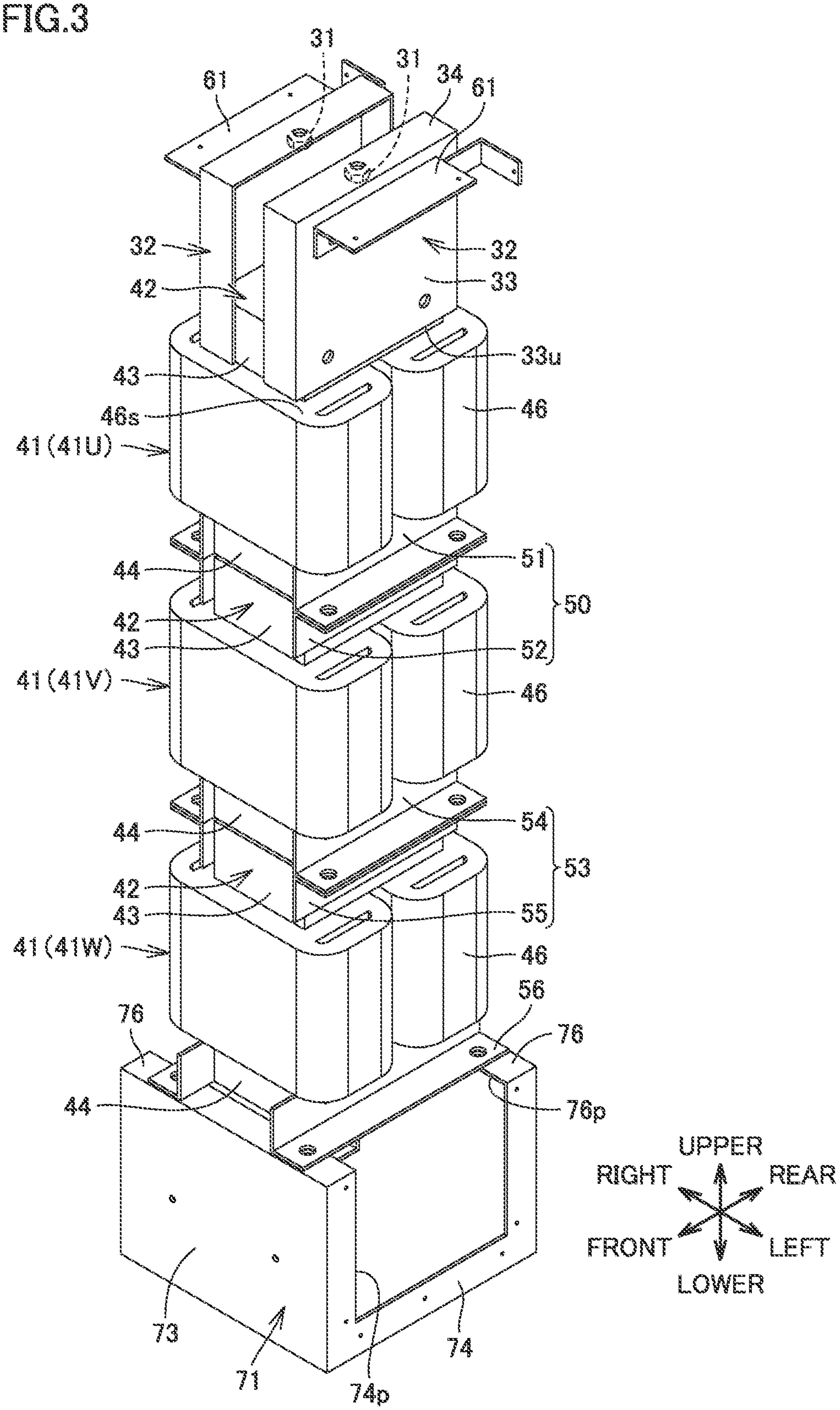
FIG. 3 is a perspective view showing a transformer and a frame structure in the transformer device shown in FIG. 1.
Figure 4:
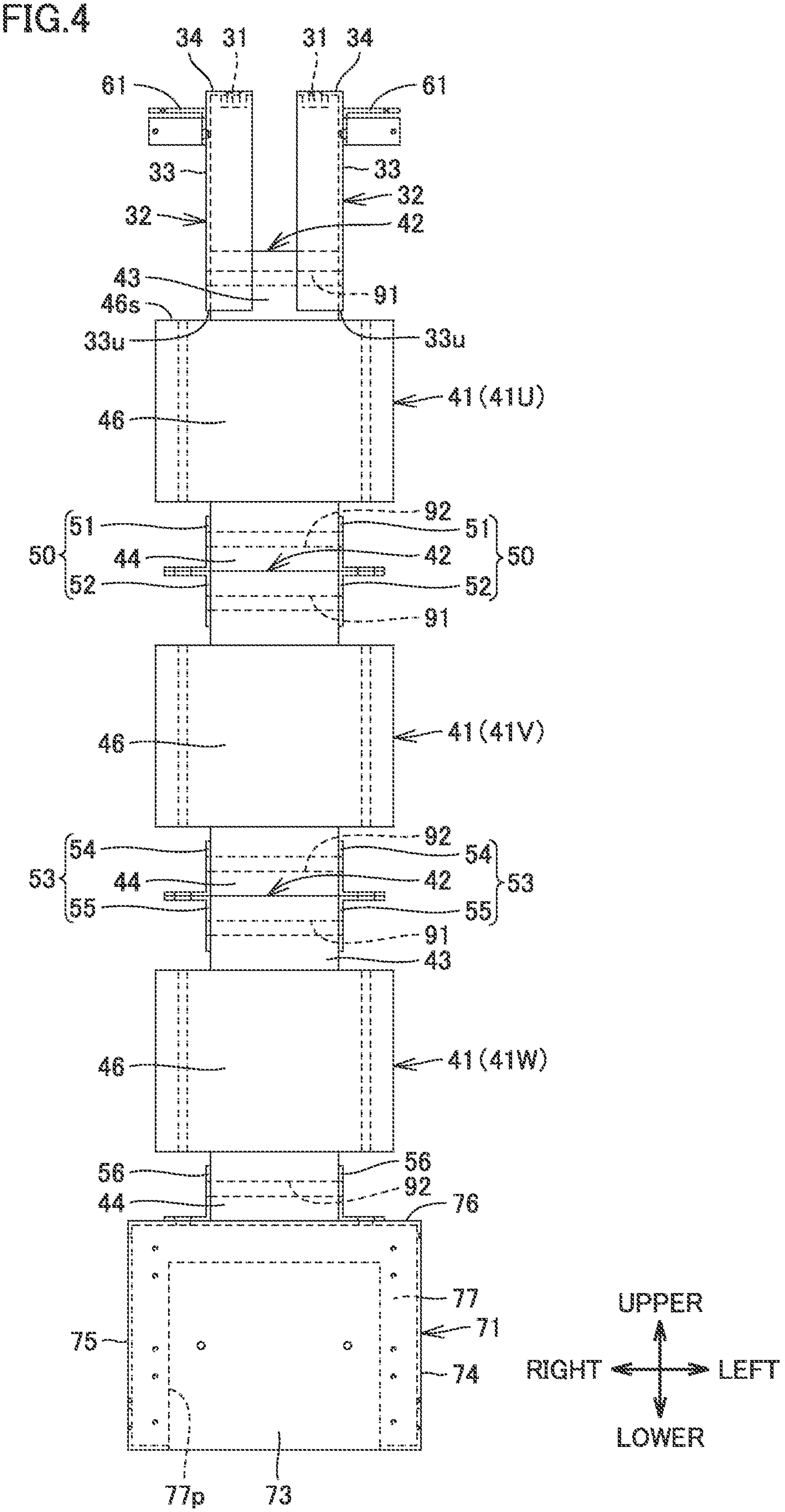
FIG. 4 is a front view showing the transformer and the frame structure in the transformer device shown in FIG. 1.
Figure 5:
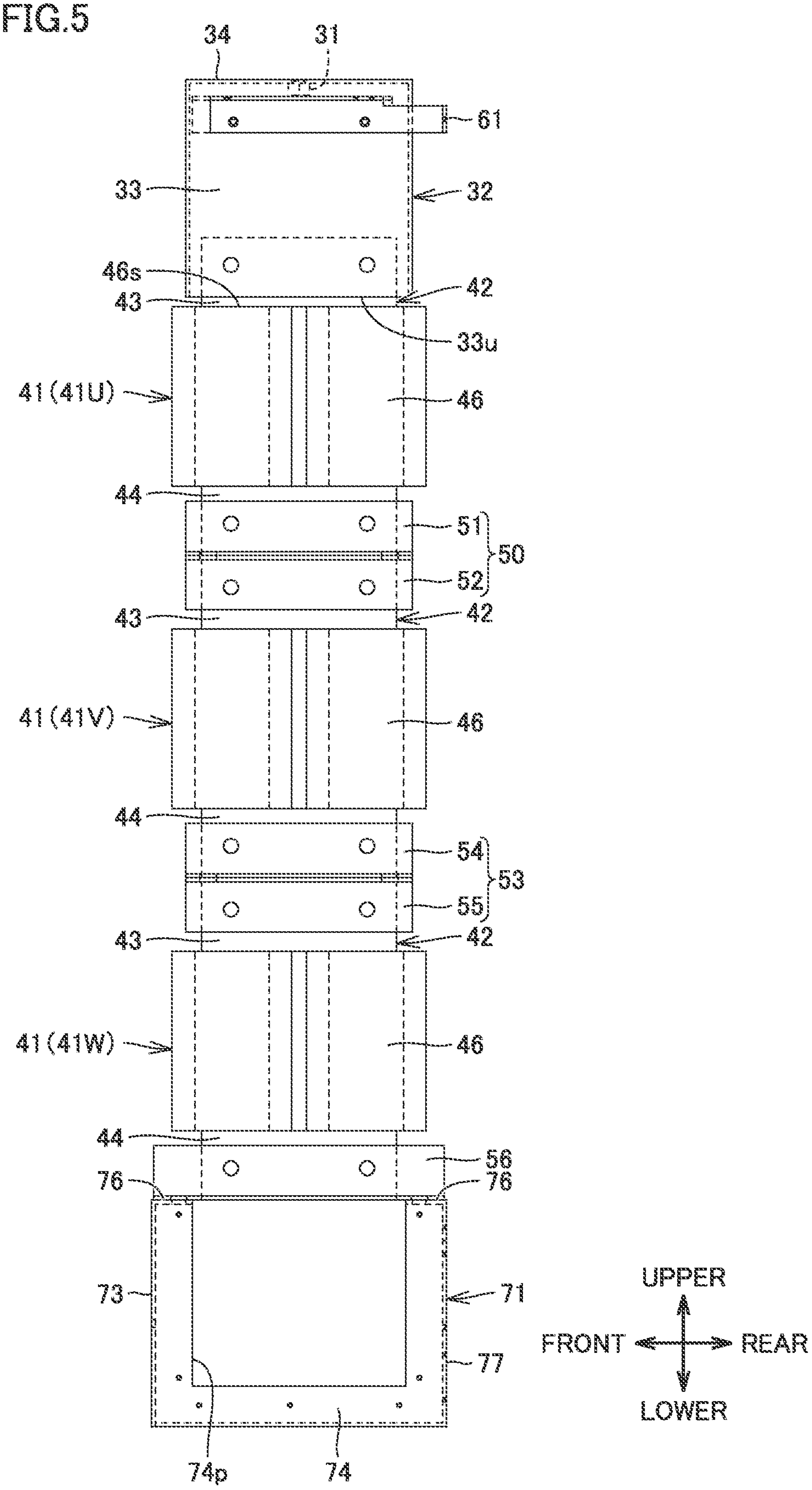
FIG. 5 is a left side view showing the transformer and the frame structure in the transformer device shown in FIG. 1.
Figure 6:
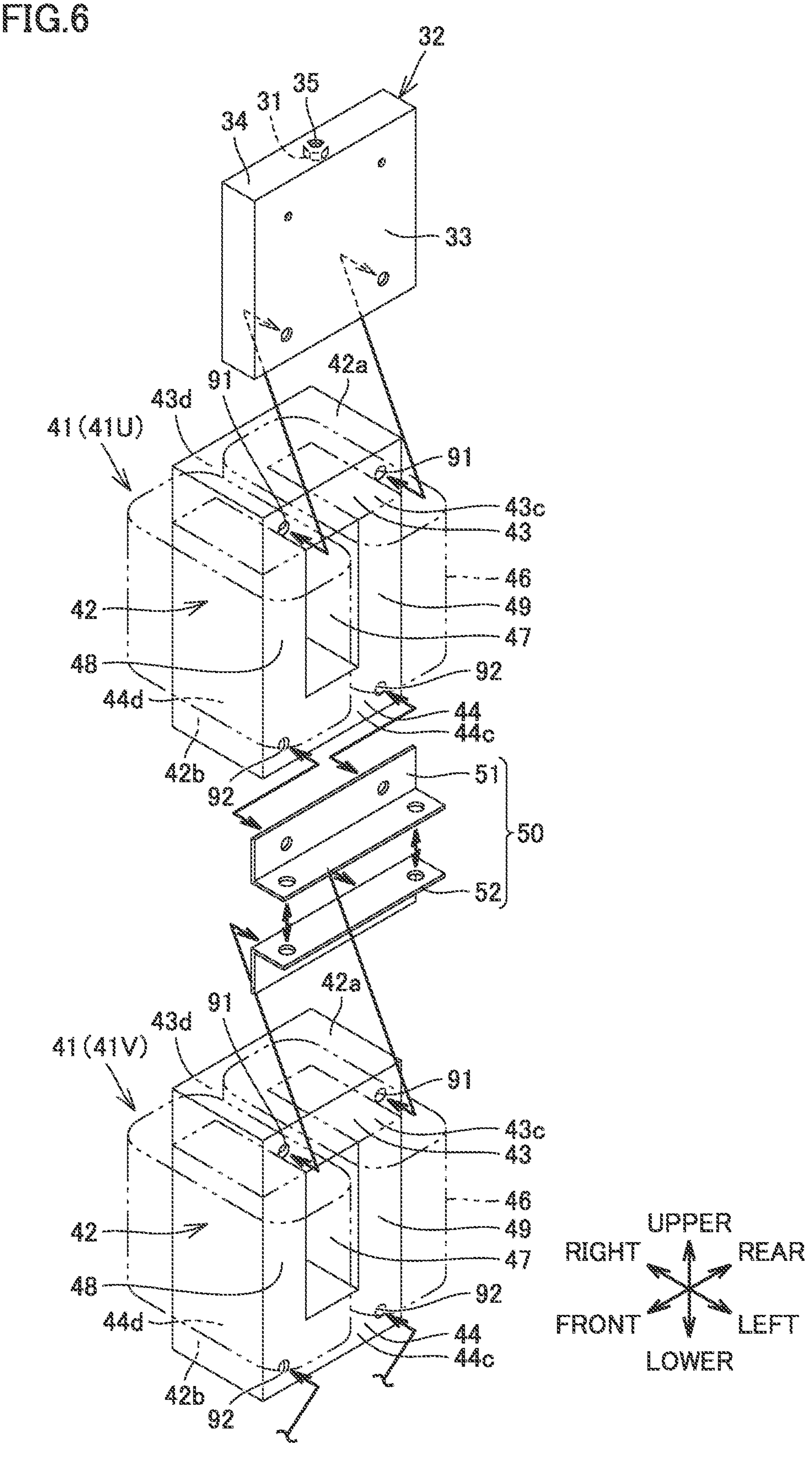
FIG. 6 is an exploded assembly diagram partially showing the transformer and the frame structure in FIGS. 3 to 5.
Figure 7:
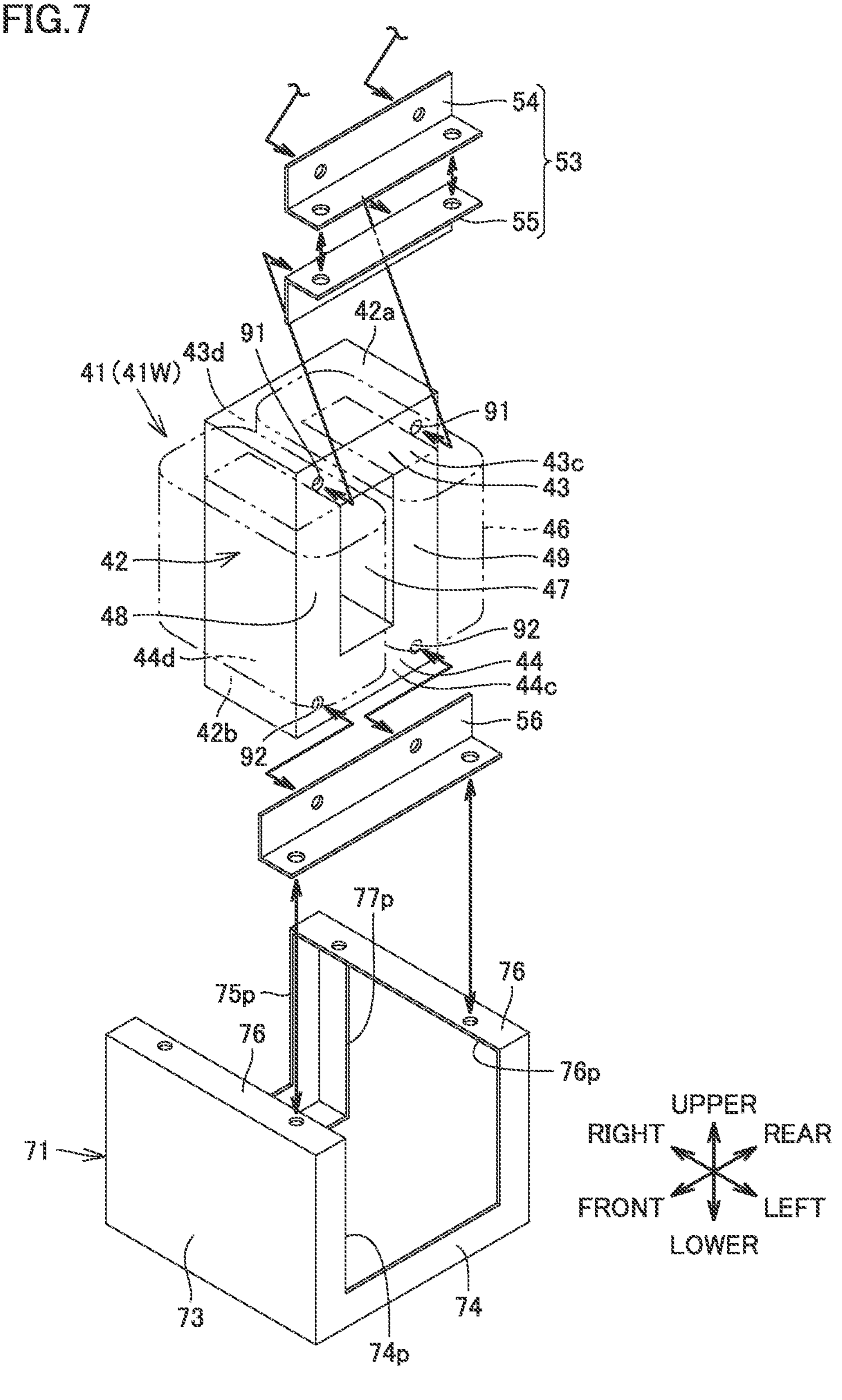
FIG. 7 is an exploded assembly diagram showing remaining portions of the transformer and the frame structure in FIGS. 3 to 5.

FIG. 3 is a perspective view showing a transformer and a frame structure in the transformer device shown in FIG. 1. FIG. 4 is a front view showing the transformer and the frame structure in the transformer device shown in FIG. 1. FIG. 5 is a left side view showing the transformer and the frame structure in the transformer device shown in FIG. 1. FIG. 6 is an exploded assembly diagram partially showing the transformer and the frame structure in FIGS. 3 to 5. FIG. 7 is an exploded assembly diagram showing remaining portions of the transformer and the frame structure in FIGS. 3 to 5.

Referring to FIGS. 1 to 7, a transformer device 100 according to the present embodiment is used for a machine tool such as a lathe, a machining center, a combined processing machine having a lathe turning function and a milling function, or an AM/SM hybrid processing machine capable of performing additive manufacturing (AM) processing for a workpiece and subtractive manufacturing (SM) processing for a workpiece.

By way of example, transformer device 100 is installed in a machine tool as a device described below. Specifically, when a machine tool manufactured in the first country adapting the first voltage as a commercial power supply is exported to the second country adapting the second voltage as a commercial power supply, the device as transformer device 100 is used for transforming the second voltage supplied to the machine tool in the second country into the first voltage that can be used by the machine tool.

While the figures show “front”, “rear”, “right”, and “left” for convenience of description of the structure of transformer device 100, the relation between each of these directions and the arrangement of the internal structure of transformer device 100 is not particularly limited. The figures further show “upper” and “lower”. The “upper” side corresponds to the side of a ceiling of a factory or the like where transformer device 100 is installed. The “lower” side corresponds to the side of a floor of a factory or the like where transformer device 100 is installed.

Transformer device 100 includes a transformer 41. Transformer 41 forms a main body of transformer device 100 that raises or lowers a voltage. Transformer 41 includes a core 42 and a coil 46.

Core 42 is made of a magnetic material. As shown in FIGS. 6 and 7, core 42 has a rectangular cylindrical shape. Core 42 is provided with a hollow portion 47.

Core 42 includes a first vertical rib portion 48, a first lateral rib portion 43, a second vertical rib portion 49, and a second lateral rib portion 44. First vertical rib portion 48, first lateral rib portion 43, second vertical rib portion 49, and second lateral rib portion 44 are provided to extend around the circumference of hollow portion 47.

First lateral rib portion 43 and second lateral rib portion 44 extend such that their longitudinal directions correspond to the horizontal direction (the front-rear direction). First lateral rib portion 43 and second lateral rib portion 44 are spaced apart from each other in the up-down direction. First vertical rib portion 48 and second vertical rib portion 49 extend such that their longitudinal directions correspond to the up-down direction. First vertical rib portion 48 and second vertical rib portion 49 are spaced apart from each other in the horizontal direction (the front-rear direction). The upper end portion and the lower end portion of first vertical rib portion 48 are connected to first lateral rib portion 43 and second lateral rib portion 44, respectively. The upper end portion and the lower end portion of second vertical rib portion 49 are connected to first lateral rib portion 43 and second lateral rib portion 44, respectively.

Core 42 has a top surface 42*a* and a bottom surface 42*b*. Top surface 42*a* is a horizontal plane facing upward. Top surface 42*a* is provided on first lateral rib portion 43. Bottom surface 42*b* is a horizontal plane facing downward. Bottom surface 42*b* is provided on second lateral rib portion 44.

First lateral rib portion 43 has a first side surface 43*c* and a second side surface 43*d*. First side surface 43*c* is a vertical plane facing in the horizontal direction (leftward). Second side surface 43*d* is disposed on the rear side of first side surface 43*c*. Second side surface 43*d* is a vertical plane facing in the horizontal direction (rightward) opposite to the direction in which first side surface 43*c* faces. Second lateral rib portion 44 has a third side surface 44*c* and a fourth side surface 44*d*. Third side surface 44*c* is a vertical plane facing in the horizontal direction (leftward). Fourth side surface 44*d* is disposed on the rear side of third side surface 44*c*. Fourth side surface 44*d* is a vertical plane facing in the horizontal direction (rightward) opposite to the direction in which third side surface 44*c* faces.

Core 42 is provided with a first insertion hole 91 and a second insertion hole 92. First insertion hole 91 is provided in first lateral rib portion 43. First insertion hole 91 is formed as a through hole extending between first side surface 43*c* and second side surface 43*d*. First lateral rib portion 43 is provided with a plurality of first insertion holes 91. The plurality of first insertion holes 91 are spaced apart from each other in the horizontal direction (the front-rear direction). Second insertion hole 92 is provided in second lateral rib portion 44. Second insertion hole 92 is formed as a through hole extending between third side surface 44*c* and fourth side surface 44*d*. Second lateral rib portion 44 is provided with a plurality of second insertion holes 92. The plurality of second insertion holes 92 are spaced apart from each other in the horizontal direction (the front-rear direction).

Coil 46 is formed by winding a conductive wire around core 42. The conductive wire is, for example, a rectangular wire having a rectangular cross section.

Coil 46 includes a coil on the input side (a primary-side coil) and a coil on the output side (a secondary-side coil). Coil 46 on the input side is provided to extend around the circumference of one of first vertical rib portion 48 and second vertical rib portion 49. Coil 46 on the output side is provided to extend around the circumference of the other of first vertical rib portion 48 and second vertical rib portion 49. First lateral rib portion 43 and second lateral rib portion 44 are exposed from coil 46.

Transformer device 100 includes a U-phase transformer 41U, a V-phase transformer 41V, and a W-phase transformer 41W each as transformer 41.

U-phase transformer 41U, V-phase transformer 41V, and W-phase transformer 41W are stacked in the up-down direction. V-phase transformer 41V (the second phase transformer) is stacked above W-phase transformer 41W (the first phase transformer). U-phase transformer 41U (the third phase transformer) is stacked above V-phase transformer 41V (the second phase transformer).

As shown in FIGS. 6 and 7, V-phase transformer 41V and W-phase transformer 41W are disposed such that bottom surface 42*b* of core 42 included in V-phase transformer 41V and top surface 42*a* of core 42 included in W-phase transformer 41W face each other in the up-down direction. Also, U-phase transformer 41U and V-phase transformer 41V are disposed such that bottom surface 42*b* of core 42 included in U-phase transformer 41U and top surface 42*a* of core 42 included in V-phase transformer 41V face each other in the up-down direction.

Note that the order in which U-phase transformer 41U, V-phase transformer 41V, and W-phase transformer 41W are stacked in the up-down direction is not particularly limited.

Transformer device 100 further includes a first connection member 53. First connection member 53 connects core 42 of W-phase transformer 41W and core 42 of V-phase transformer 41V. First connection member 53 is made of metal. First connection member 53 is made of sheet metal.

First connection member 53 has a first angle 54 and a second angle 55. First angle 54 and second angle 55 each are an L-shaped angle.

First angle 54 and second angle 55 are superimposed on each other in the up-down direction while facing in opposite directions in the up-down direction. First angle 54 and second angle 55 are connected to each other by a fastening member (not shown) such as a bolt. First angle 54 is fastened to second lateral rib portion 44 of core 42 in V-phase transformer 41V by a fastening member (not shown) such as a bolt. Second angle 55 is fastened to first lateral rib portion 43 of core 42 in W-phase transformer 41W by a fastening member (not shown) such as a bolt.

First connection members 53 (first angle 54 and second angle 55) are provided as a pair on the right and left sides with cores 42 of W-phase transformer 41W and V-phase transformer 41V interposed therebetween. The pair of right and left first angles 54 are fastened to second lateral rib portion 44 of core 42 in V-phase transformer 41V by a fastening member (not shown) such as a bolt that is inserted into second insertion hole 92 of core 42 in V-phase transformer 41V. The pair of right and left second angles 55 are fastened to first lateral rib portion 43 of core 42 in W-phase transformer 41W by a fastening member (not shown) such as a bolt that is inserted into first insertion hole 91 of core 42 in W-phase transformer 41W.

Transformer device 100 further includes a second connection member 50. Second connection member 50 connects core 42 of V-phase transformer 41V and core 42 of U-phase transformer 41U. Second connection member 50 is made of metal. Second connection member 50 is made of sheet metal.

Second connection member 50 connects core 42 of V-phase transformer 41V and core 42 of U-phase transformer 41U in the same manner as first connection member 53 that connects core 42 of W-phase transformer 41W and core 42 of V-phase transformer 41V.

Second connection member 50 has a third angle 51 corresponding to first angle 54 in first connection member 53, and a fourth angle 52 corresponding to second angle 55 in first connection member 53. Third angle 51 and fourth angle 52 are connected to each other by a fastening member (not shown) such as a bolt. Third angle 51 is fastened to second lateral rib portion 44 of core 42 in U-phase transformer 41U by a fastening member (not shown) such as a bolt. Fourth angle 52 is fastened to first lateral rib portion 43 of core 42 in V-phase transformer 41V by a fastening member (not shown) such as a bolt.

Second connection members 50 (third angle 51 and fourth angle 52) are provided as a pair on the right and left sides with cores 42 of V-phase transformer 41V and U-phase transformer 41U interposed therebetween.

In the above description of the present embodiment, each of first connection member 53 and second connection member 50 is formed of a combination of two L-shaped angles, but the present invention is not limited thereto. Each of the first connection member and the second connection member in the present invention may be formed, for example, of a flat plate extending between cores of transformers adjacent to each other in the up-down direction.

Figure 8:
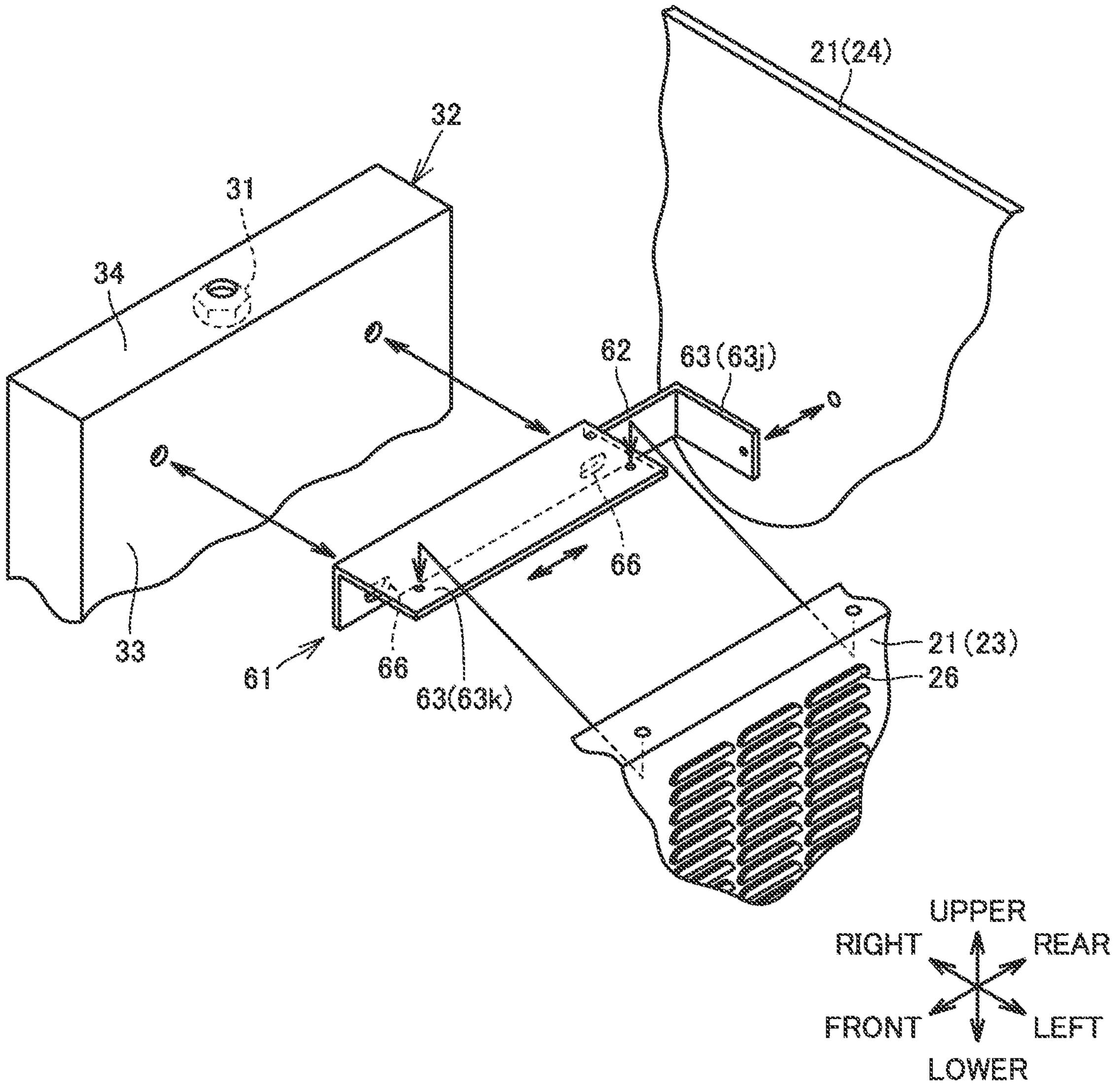
FIG. 8 is an exploded assembly diagram showing an upper frame, a third connection member, and a cover body.

FIG. 8 is an exploded assembly diagram showing an upper frame, a third connection member, and a cover body. Referring to FIGS. 1 to 8, transformer device 100 further includes an upper frame 32 (a suspension tool attachment unit) and a third connection member 61.

Upper frame 32 is connected to core 42. Upper frame 32 is disposed above coil 46 wound around core 42. Upper frame 32 is configured such that a suspension tool 200 for suspending transformer device 100 is attachable thereto.

Upper frame 32 is connected to core 42 of U-phase transformer 41U. Upper frame 32 is connected to first lateral rib portion 43 of core 42 in U-phase transformer 41U. Upper frame 32 is connected to core 42 at a position above coil 46 in U-phase transformer 41U. Upper frame 32 is made of metal. Upper frame 32 is made of sheet metal.

Upper frame 32 has a vertical plate portion 33, an upper plate portion 34, and a nut 31. Vertical plate portion 33 is formed of a flat plate orthogonal to the horizontal direction (the right-left direction). Vertical plate portion 33 is fastened to first lateral rib portion 43 of core 42 in U-phase transformer 41U by a fastening member (not shown) such as a bolt. Vertical plate portion 33 extends upward from first lateral rib portion 43. Vertical plate portion 33 has a lower end portion 33*u* located above an upper end portion 46*s* of coil 46 in U-phase transformer 41U. Lower end portion 33*u* of vertical plate portion 33 faces upper end portion 46*s* of coil 46 in U-phase transformer 41U in the up-down direction.

Upper plate portion 34 is formed of a flat plate orthogonal to the up-down direction. Upper plate portion 34 is provided at a position angled with respect to the upper end portion of vertical plate portion 33 to extend from the upper end portion in the right-left direction. Together with vertical plate portion 33, upper plate portion 34 forms a corner portion at an angle of 90°. Upper plate portion 34 is disposed on top surface 42*a* of core 42 in U-phase transformer 41U.

Nut 31 is fixed to upper plate portion 34. Nut 31 is welded to the bottom surface of upper plate portion 34 as a back nut. Nut 31 can fasten a suspension tool 200 that serves to suspend transformer device 100.

As an example shown in FIG. 1, suspension tool 200 for suspending transformer device 100 is an eyebolt including: a ring portion through which a wire, a hook, or the like can be passed; and a threaded portion screwed into nut 31. Suspension tool 200 may be a T-shaped bolt including: a lateral shaft portion over which a wire, a hook, or the like can be placed; and a threaded portion screwed into nut 31.

Upper frames 32 are provided as a pair on the right and left sides with first lateral rib portion 43 of core 42 in U-phase transformer 41U interposed therebetween. Vertical plate portions 33 of the pair of right and left upper frames 32 are fastened to first lateral rib portion 43 of core 42 in U-phase transformer 41U by fastening members (not shown) such as bolts inserted into first insertion holes 91 of core 42 in U-phase transformer 41U.

Third connection member 61 connects upper frame 32 and a cover body 21 (a side cover 23 and a rear cover 24) which will be described later. The structure of third connection member 61 will be described later in detail.

Figure 9:
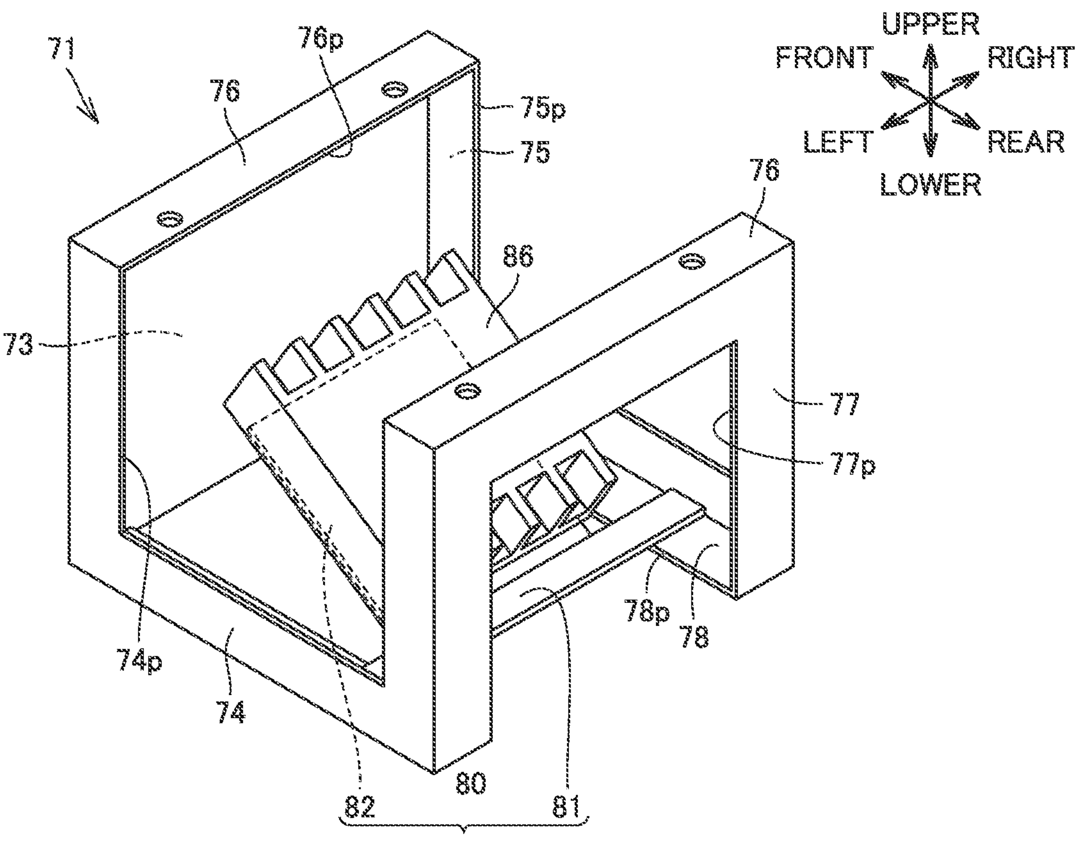
FIG. 9 is a perspective view showing a lower frame.

FIG. 9 is a perspective view showing a lower frame. Referring to FIGS. 1 to 9, transformer device 100 further includes a lower frame 71 and an angle 56. Lower frame 71 is disposed below W-phase transformer 41W. Lower frame 71 is connected to W-phase transformer 41W.

Lower frame 71 is provided on a floor of a factory or the like where transformer device 100 is installed. Lower frame 71 is connected to core 42 of W-phase transformer 41W. Lower frame 71 is connected to second lateral rib portion 44 of core 42 in W-phase transformer 41W.

Lower frame 71 is connected to W-phase transformer 41W through angle 56. Angle 56 is an L-shaped angle. Angle 56 is fastened to second lateral rib portion 44 of core 42 in W-phase transformer 41W by a fastening member (not shown) such as a bolt. Angle 56 is fastened to lower frame 71 by a fastening member (not shown) such as a bolt. Angles 56 are provided as a pair on the right and left sides with second lateral rib portion 44 of core 42 in W-phase transformer 41W interposed therebetween.

Lower frame 71 is entirely formed of a frame member having a rectangular parallelepiped appearance. Lower frame 71 has a front surface portion 73, a left side surface portion 74, a right side surface portion 75, an upper surface portion 76, a rear surface portion 77, and a lower surface portion 78.

Front surface portion 73 is disposed on the front side of lower frame 71 having a rectangular parallelepiped appearance. Front surface portion 73 is formed of a flat plate orthogonal to the front-rear direction. Left side surface portion 74 is disposed on the left side of lower frame 71 having a rectangular parallelepiped appearance. Left side surface portion 74 is provided with an opening 74*p* opened upward. Left side surface portion 74 has a frame shape extending along the front edge, the lower edge, and the rear edge of opening 74*p*. Right side surface portion 75 is disposed on the right side of lower frame 71 having a rectangular parallelepiped appearance. Right side surface portion 75 is provided with an opening 75*p* opened upward. Right side surface portion 75 has a frame shape extending along the front edge, the lower edge, and the rear edge of opening 75*p*.

Upper surface portion 76 is disposed on the upper side of lower frame 71 having a rectangular parallelepiped appearance. Upper surface portion 76 is provided with an opening 76*p* opened in the right-left direction. Upper surface portion 76 has a frame shape extending along the front edge and the rear edge of opening 76*p*. Angle 56 is fastened to upper surface portion 76 by a fastening member (not shown) such as a bolt.

Rear surface portion 77 is disposed on the rear side of lower frame 71 having a rectangular parallelepiped appearance. Rear surface portion 77 is provided with an opening 77*p* opened downward. Rear surface portion 77 has a frame shape extending along the right edge, the upper edge, and the left edge of opening 77*p*. Lower surface portion 78 is disposed on the lower side of lower frame 71 having a rectangular parallelepiped appearance. Lower surface portion 78 is provided with an opening 78*p* opened frontward and rearward. Lower surface portion 78 has a frame shape extending along the right edge and the left edge of opening 78*p*.

As shown in FIGS. 1 and 2, transformer device 100 further includes a cover body 21.

Cover body 21 has an internal space 110 that accommodates transformer 41 (41U, 41V, 41W). Internal space 110 further accommodates upper frame 32, third connection member 61, and lower frame 71.

Cover body 21 entirely has a rectangular parallelepiped appearance. The length of cover body 21 in the up-down direction is greater than the length of cover body 21 in the front-rear direction and greater than the length of cover body 21 in the right-left direction. Cover body 21 is supported by upper frame 32 and lower frame 71. Upper frame 32 and lower frame 71 function as frame members that support cover body 21 above and below transformer 41 (41U, 41V, 41W).

More specifically, cover body 21 has a front cover 22, a side cover 23 (23L, 23R), a rear cover 24, and a top cover 25.

Front cover 22 is disposed on the front side of cover body 21 having a rectangular parallelepiped appearance. Front cover 22 is fastened to front surface portion 73 of lower frame 71 by a fastening member (not shown) such as a bolt.

Side covers 23 (23L, 23R) are provided as a pair on the right and left sides. A side cover 23L is disposed on the left side of cover body 21 having a rectangular parallelepiped appearance, and a side cover 23R is disposed on the right side of cover body 21 having a rectangular parallelepiped appearance. Side covers 23L and 23R are bilaterally symmetrical in shape.

Side cover 23 is provided with a first opening 27 and a second opening 26. First opening 27 is provided to allow communication between internal space 110 and a space outside internal space 110. First opening 27 includes a plurality of slits penetrating through side cover 23. First opening 27 is located below W-phase transformer 41W. First opening 27 is entirely located at a position lower than bottom surface 42*b* of core 42 in W-phase transformer 41. A part of first opening 27 may be located at a position lower than bottom surface 42*b* of core 42 in W-phase transformer 41. First opening 27 faces, in the horizontal direction (the right-left direction), openings 74*p* and 75*p* provided in lower frame 71.

Second opening 26 is provided to allow communication between internal space 110 and a space outside internal space 110. Second opening 26 includes a plurality of slits penetrating through side cover 23. Second opening 26 is located above U-phase transformer 41. A part of second opening 26 is located at a position higher than coil 46 in U-phase transformer 41. Second opening 26 may be entirely located at a position higher than coil 46 in U-phase transformer 41. Second opening 26 faces upper frame 32 in the horizontal direction (the right-left direction).

By a fastening member (not shown) such as a bolt, side cover 23 (23L, 23R) is fastened to: third connection member 61 connected to upper frame 32; and right side surface portion 75 or left side surface portion 74 of lower frame 71.

Rear cover 24 is disposed on the rear surface side of cover body 21 having a rectangular parallelepiped appearance. By a fastening member (not shown) such as a bolt, rear cover 24 is fastened to: third connection member 61 connected to upper frame 32; and rear surface portion 77 of lower frame 71.

Top cover 25 is disposed on the upper surface side of cover body 21 having a rectangular parallelepiped appearance. Top cover 25 is provided to cover upper frame 32 from above. Top cover 25 is fastened to upper frame 32 by a fastening member (not shown) such as a bolt. As shown in FIG. 1, top cover 25 is provided with a through hole 25*p* through which suspension tool 200 such as an eyebolt can be inserted into nut 31 provided in upper frame 32.

Cover body 21 forms an enclosure surrounding transformer 41 (41U, 41V, 41W), whereas upper frame 32 does not form such an enclosure. Upper frame 32 is accommodated inside (in internal space 110 of) cover body 21. Upper frame 32 may be provided to extend from a position inside cover body 21 at which upper frame 32 is connected to core 42 of U-phase transformer 41U and penetrate through cover body 21 to the outside of cover body 21.

In the case of transportation of transformer device 100, a threaded portion of suspension tool 200 such as an eyebolt is screwed into nut 31 provided in upper frame 32, and thereby, suspension tool 200 is attached to upper frame 32. Suspension tool 200 such as an eyebolt may be permanently attached to upper frame 32, or may be prepared when transformer device 100 is transported. In the state in which a belt or a hook is placed over suspension tool 200 such as an eyebolt, transformer device 100 is lifted up using a crane or the like.

In the present embodiment, in transformer device 100 having a vertically stacked structure in which cores 42 of V-phase transformer 41V and W-phase transformer 41W stacked in the up-down direction are connected to each other by first connection member 53, and cores 42 of U-phase transformer 41U and V-phase transformer 41V stacked in the up-down direction are connected to each other by second connection member 50, upper frame 32 to which suspension tool 200 is attached is connected to core 42 of U-phase transformer 41U that is stacked on the uppermost stage among U-phase transformer 41U, V-phase transformer 41V, and W-phase transformer 41W.

In the configuration as described above, when transformer device 100 is lifted up, a heavy weight of transformer 41 (41U, 41V, 41W) can be exerted on upper frame 32 disposed above coil 46 of U-phase transformer 41U without cover body 21 interposed therebetween. This eliminates the need to provide cover body 21 with high rigidity, so that the manufacturing cost of transformer device 100 can be reduced.

Further, cover body 21 is supported by upper frame 32 and lower frame 71 disposed above and below transformer 41 (41U, 41V, 41W). This configuration eliminates the need to provide a frame member for supporting cover body 21 around transformers 41 (41U, 41V, 41W) stacked in the up-down direction. This simplifies the structure of transformer device 100, and thereby, the manufacturing cost of transformer device 100 can be further reduced.

Cover body 21 (side cover 23) is provided with first opening 27 and second opening 26 as vents. As heat is generated in transformer 41 (41U, 41V, 41W), an air flow is formed as shown by arrows in FIG. 2 such that air flows into internal space 110 through first opening 27 and is discharged to the space outside internal space 110 through second opening 26.

According to the configuration as described above, the circumference of transformer 41 (41U, 41V, 41W) is frameless as described above, which allows air as cooling air to flow more smoothly in internal space 110. Thereby, the cooling efficiency for transformer 41 (41U, 41V, 41W) can be improved.

Referring to FIG. 8, third connection member 61 is configured to be adjustable in position in accordance with the mutual positional relation between upper frame 32 and cover body 21 (side cover 23 and rear cover 24). Third connection member 61 is configured to be adjustable in position in accordance with the mutual positional relation between upper frame 32 and cover body 21 (side cover 23 and rear cover 24) in the front-rear direction.

More specifically, third connection member 61 includes a first connection portion 62 and a second connection portion 63 (63*j*, 63*k*). First connection portion 62 has a flat plate shape orthogonal to the right-left direction. First connection portion 62 is provided with an elongated hole 66 having a longitudinal direction extending in the front-rear direction. First connection portion 62 is provided with a plurality of elongated holes 66 spaced apart from each other in the front-rear direction. First connection portion 62 is fastened to upper frame 32 (vertical plate portion 33) by a fastening member (not shown) such as a bolt that is inserted into elongated hole 66.

Second connection portion 63 is connected to cover body 21. A second connection portion 63*j* has a flat plate shape orthogonal to the front-rear direction. Second connection portion 63*j* is provided at a position angled with respect to the rear end portion of first connection portion 62 to extend from the rear end portion in the right-left direction. Second connection portion 63*j* is connected to rear cover 24 by a fastening member (not shown) such as a bolt. Second connection portion 63*k* has a flat plate shape orthogonal to the up-down direction. Second connection portion 63*k* is provided at a position angled with respect to the upper end portion of first connection portion 62 to extend from the upper end portion in the right-left direction. Second connection portion 63*k* is connected to side cover 23 by a fastening member (not shown) such as a bolt.

In the present embodiment, U-phase transformer 41U, V-phase transformer 41V, and W-phase transformer 41W are stacked in the up-down direction, and then, upper frame 32 is connected to core 42 of U-phase transformer 41U stacked on the uppermost stage, and lower frame 71 is connected to core 42 of W-phase transformer 41W stacked on the lowermost stage. In the configuration as described above, cover body 21 is supported by upper frame 32 and lower frame 71 spaced apart from each other in the up-down direction, which may cause a positional deviation between cover body 21 and upper frame 32 or lower frame 71.

In view of the above, by adjusting the position of third connection member 61 in the front-rear direction corresponding to the longitudinal direction of elongated hole 66, the positional deviation occurring between upper frame 32 and cover body 21 (side cover 23 and rear cover 24) can be absorbed. This makes it possible to facilitate the operation of attaching cover body 21.

Note that a position adjusting member corresponding to third connection member 61 may be provided at a position where lower frame 71 and cover body 21 are connected.

Referring to FIG. 9, transformer device 100 further includes an electric device 86. Electric device 86 is disposed below W-phase transformer 41W. Electric device 86 is supported by lower frame 71.

Electric device 86 is an electrical component relating to transformer device 100. Electric device 86 may include a terminal block forming a current circuit on each of the input side and the output side of transformer 41, or a breaker that cuts off the current circuit when an overcurrent occurs.

Electric device 86 is disposed in a space surrounded by front surface portion 73, left side surface portion 74, right side surface portion 75, upper surface portion 76, rear surface portion 77, and lower surface portion 78. Electric device 86 is located to face openings 74*p* and 75*p* of lower frame 71 in the horizontal direction (the right-left direction). Electric device 86 is located to face opening 77*p* of lower frame 71 in the horizontal direction (the front-rear direction).

Electric device 86 is attached to lower frame 71 with an attachment member 80 interposed therebetween. Attachment member 80 includes a frame portion 81 and a flat plate portion 82. Frame portion 81 has a frame shape extending in the horizontal direction (the right-left direction). Frame portion 81 extends between lower surface portions 78 on the right and left sides in lower frame 71. Flat plate portion 82 is formed of a flat plate extending from frame portion 81. Flat plate portion 82 extends obliquely upward from frame portion 81 as it comes closer to front surface portion 73 in the front-rear direction. Electric device 86 is mounted on flat plate portion 82.

Note that rear cover 24 of cover body 21 is provided with a through hole (not shown) through which wires extending from electric device 86 pass.

According to the configuration as described above, electric device 86 can be disposed by making use of the space below W-phase transformer 41W stacked on the lowermost stage among U-phase transformer 41U, V-phase transformer 41V, and W-phase transformer 41W. Further, air outside cover body 21 flows into lower frame 71 through first opening 27 provided in side cover 23 (23L, 23R) and openings 74*p*, 75*p* provided in lower frame 71, so that electric device 86 can be efficiently cooled.

As a summary of the structure of transformer device 100 according to the first embodiment of the present invention described above, transformer device 100 according to the present embodiment includes: transformer 41 including core 42 and coil 46 wound around core 42; and upper frame 32 disposed above coil 46, connected to core 42 and serving as a suspension tool attachment unit to which suspension tool 200 for suspending transformer device 100 is attachable.

According to transformer device 100 in the first embodiment of the present invention configured as described above, the manufacturing cost of transformer device 100 can be reduced in the configuration with consideration given to the operation of lifting up transformer device 100.

In the above description of the present embodiment, the suspension tool attachment unit according to the present invention is upper frame 32 to which suspension tool 200 such as an eyebolt is attachable, but the present invention is not limited thereto. For example, a shackle formed of a U-shaped fitting and a threaded portion serving as a bridge across an opening of the U-shaped fitting can be used as a suspension tool. In this case, a frame body provided with a hole through which the threaded portion of the shackle is passed may be used as the suspension tool attachment unit in the present invention.

Second Embodiment

Figure 10:
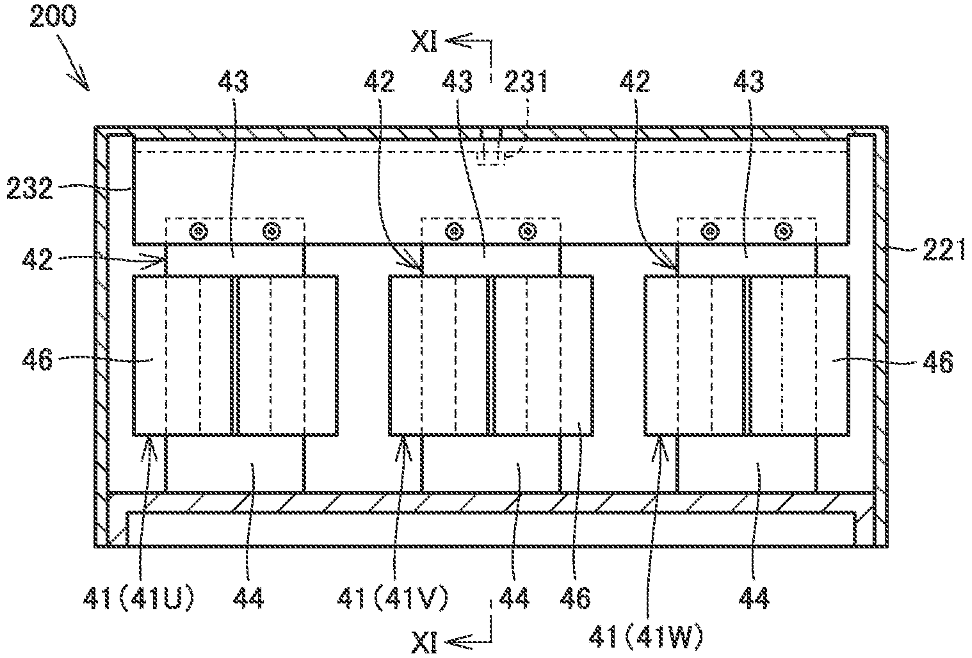
FIG. 10 is a cross-sectional view showing a transformer device according to a second embodiment of the present invention.
Figure 11:
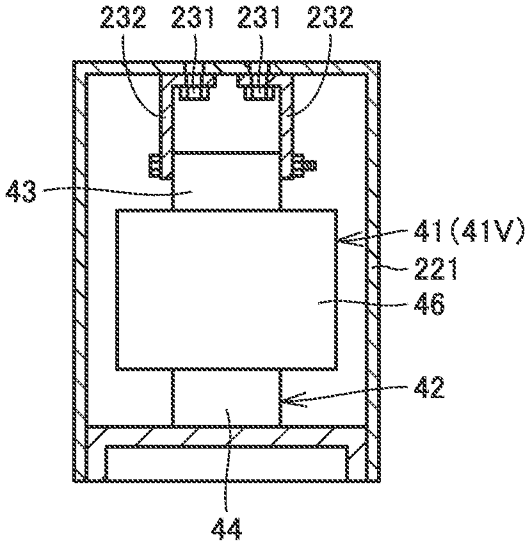
FIG. 11 is a cross-sectional view showing the transformer device taken along an arrow line XI-XI in FIG. 10.

FIG. 10 is a cross-sectional view showing a transformer device in the second embodiment of the present invention. FIG. 11 is a cross-sectional view showing the transformer device taken along an arrow line XI-XI in FIG. 10. In the present embodiment, the description of the same configuration as that of transformer device 100 in the first embodiment will not be repeated.

Referring to FIGS. 10 and 11, in the present embodiment, U-phase transformer 41U, V-phase transformer 41V, and W-phase transformer 41W are arranged in the horizontal direction. The order in which U-phase transformer 41U, V-phase transformer 41V, and W-phase transformer 41W are arranged in the horizontal direction is not particularly limited.

The transformer device includes an upper frame 232 (a suspension tool attachment unit). Upper frame 232 is connected to core 42 of U-phase transformer 41U, core 42 of V-phase transformer 41V, and core 42 of W-phase transformer 41W. Upper frame 232 extends in the horizontal direction such that U-phase transformer 41U, V-phase transformer 41V, and W-phase transformer 41W are arranged in the longitudinal direction. Upper frame 32 is disposed above core 42 of each of U-phase transformer 41U, V-phase transformer 41V, and W-phase transformer 41W. Upper frame 232 is fastened by a fastening member such as a bolt to first lateral rib portion 43 of core 42 in U-phase transformer 41U, first lateral rib portion 43 of core 42 in V-phase transformer 41V, and first lateral rib portion 43 of core 42 in W-phase transformer 41W.

Upper frame 232 is formed of an L-shaped angle. As shown in FIG. 11, upper frames 232 are provided as a pair on the right and left sides with core 42 of transformer 41 (41U, 41V, 41W) interposed therebetween. Upper frame 232 is configured such that a suspension tool for suspending a transformer device is attachable thereto.

Upper frame 232 includes a nut 231. Nut 231 can fasten the suspension tool for suspending the transformer device.

The transformer device further includes a cover body 221. Cover body 221 accommodates transformer 41 (41U, 41V, 41W). Upper frame 232 is accommodated inside cover body 221.

According to the configuration as described above, when the transformer device is lifted up, a heavy weight of transformer 41 (41U, 41V, 41W) can be exerted on upper frame 232 disposed above core 42 of each of U-phase transformer 41U, V-phase transformer 41V, and W-phase transformer 41W without cover body 221 interposed therebetween. This eliminates the need to provide cover body 221 with high rigidity, so that the manufacturing cost of the transformer device can be reduced.

The transformer device according to the second embodiment of the present invention configured as described above can similarly achieve the effect described in the first embodiment.

Note that upper frame 232 may be divided between U-phase transformer 41U and V-phase transformer 41V and also between V-phase transformer 41V and W-phase transformer 41W. In this case, nut 231 capable of fastening a suspension tool may be provided in at least one of upper frame 232 connected to U-phase transformer 41U, upper frame 232 connected to V-phase transformer 41V, and upper frame 232 connected to W-phase transformer 41W.

By way of example, nut 231 capable of fastening a suspension tool is provided in each of upper frame 232 connected to U-phase transformer 41U and upper frame 232 connected to W-phase transformer 41W. In such a configuration, upper frame 232 connected to U-phase transformer 41U and upper frame 232 connected to W-phase transformer 41W each correspond to the suspension tool attachment unit according to the present invention.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

INDUSTRIAL APPLICABILITY

The present invention is applicable to a transformer device used in a machine tool or the like.

REFERENCE SIGNS LIST

21, 221 cover body, 22 front cover, 23, 23L, 23R side cover, 24 rear cover, 25 top cover, 25*p* through hole, 26 second opening, 27 first opening, 31, 231 nut, 32, 232 upper frame, 33 vertical plate portion, 33*u* lower end portion, 34 upper plate portion, 41 transformer, 41U U-phase transformer, 41V V-phase transformer, 41W W-phase transformer, 42 core, 42*a* top surface, 42*b* bottom surface, 43 first lateral rib portion, 43*c* first side surface, 43*d* second side surface, 44 second lateral rib portion, 44*c* third side surface, 44*d* fourth side surface, 46 coil, 46*s* upper end portion, 47 hollow portion, 48 first vertical rib portion, 49 second vertical rib portion, 50 second connection member, 51 third angle, 52 fourth angle, 53 first connection member, 54 first angle, 55 second angle, 56 angle, 61 third connection member, 62 first connection portion, 63, 63*j*, 63*k* second connection portion, 66 elongated hole, 71 lower frame, 73 front surface portion, 74 left side surface portion, 74*p*, 75*p*, 76*p*, 77*p*, 78*p* opening, 75 right side surface portion, 76 upper surface portion, 77 rear surface portion, 78 lower surface portion, 80 attachment member, 81 frame portion, 82 flat plate portion, 86 electric device, 91 first insertion hole, 92 second insertion hole, 100 transformer device, 110 internal space, 200 suspension tool.

The invention claimed is:

1. A transformer device comprising:

a transformer including a core and a coil wound around the core;

a suspension tool attachment unit disposed above the coil and connected to the core; and a cover body having an internal space that accommodates the transformer and connected to the suspension tool attachment unit, wherein a suspension tool for suspending the transformer device including the transformer and the cover body is attachable to the suspension tool attachment unit, the transformer includes a first phase transformer, a second phase transformer stacked above the first phase transformer, and a third phase transformer stacked above the second phase transformer, the suspension tool attachment unit is connected to the core of the third phase transformer, the transformer device further comprises:

a first connection member that connects the core of the first phase transformer and the core of the second phase transformer;

a second connection member that connects the core of the second phase transformer and the core of the third phase transformer; and a lower frame disposed below the first phase transformer and connected to the first phase transformer, the cover body is supported by the suspension tool attachment unit and the lower frame, the cover body is provided with:

a first opening located below the first phase transformer and allowing communication between the internal space and a space outside the internal space; and a second opening located above the third phase transformer and allowing communication between the internal space and the space outside the internal space, and an air flow is formed such that air flows into the internal space through the first opening and is discharged to the space outside the internal space through the second opening.

2. The transformer device according to claim 1, further comprising an electric device disposed below the first phase transformer and supported by the lower frame.

3. The transformer device according to claim 1, further comprising a third connection member that connects the cover body and one of the suspension tool attachment unit and the lower frame, the third connection member being adjustable in position in accordance with a mutual positional relation between the cover body and the connected one.

* * * * *